United States Patent
Ulyanitsky et al.

[15] 3,679,937
[45] July 25, 1972

[54] METHOD OF AND APPARATUS FOR BLOCKING PHASE-COMPARISON PROTECTION

[72] Inventors: Evgeny Mefodievich Ulyanitsky; Eduard Vasilievich Podgorny, both of Rostov-na-Donu, U.S.S.R.

[73] Assignee: Novocherkassky Ordens Trudovogo Krasnogo Znameni Politekhmichesky Institute imeni Sergo Ordzhonikidze, Novicherkassk, U.S.S.R.

[22] Filed: Nov. 24, 1970

[21] Appl. No.: 92,402

[52] U.S. Cl. ................................................. 317/27 R
[51] Int. Cl. .................................................. H02h 3/28
[58] Field of Search ................................... 317/27 R

[56] References Cited

UNITED STATES PATENTS

| | | |
|---|---|---|
| 3,381,178 | 4/1968 | Rockefeller..................317/27 R |
| 3,423,634 | 1/1969 | Wagner......................317/27 R X |
| 3,470,418 | 9/1969 | Hagberg et al................317/27 R |
| 3,579,040 | 5/1971 | Tenenbaum..................317/27 R |

Primary Examiner—James D. Trammell
Attorney—Holman & Stern

[57] ABSTRACT

The invention is related to a method of and an apparatus for the blocking of phase-comparison protection.

According to the invention, the method consists in that the control signals formed from separately summed incoming and outgoing currents are monitored during a predetermined time interval since the very beginning of the first half-cycle of a fault and a blocking signal is applied to the starting element of the protection apparatus only when both these signals are present, thereby preventing the protected plant from being disconnected on an external short-circuit.

The method ensures reliable selectivity and cuts down operate time of the protection.

1 Claim, 2 Drawing Figures

METHOD OF AND APPARATUS FOR BLOCKING PHASE-COMPARISON PROTECTION

The present invention relates to differential protection, and more specifically to a method for blocking of phase-comparison protection and an apparatus for the realization of this blocking.

Known in the art is a method for blocking of phase-comparison protection and apparatus for its realization, based on a comparison of the directions of the currents (flowing into and out of the protected plant), separate summation of these currents, and production from them two control signals applied to the starting element of the protection apparatus.

There exists, for example, a phase-comparison protection apparatus comprising a differential starting element, a blocking element, a phase-comparison element consisting of intermediate transformers connected in the arms of the protection apparatus, rectifiers, relays, and their logic components. (see, for example, USSR Inventor's Certificate No. 182217, Class 21 c 68/50).

In the apparatus just cited, the phase comparison utilizes unipolar rectification of currents in the protection arms and the summation of the rectified currents. In this case, it is assumed that the incoming currents are in one phase, and the outgoing currents are in the opposite phase.

In the case of an internal short-circuit when the currents of all connections are flowing to the fault, the rectified and summed current will contain no-current blanks whose magnitude will be determined by the phase shift between the currents in the protection arms and approximately equal to a half-cycle in duration. In the presence of no-current blanks, the phase-comparison element sends out a signal to an AND gate the other input of which accepts a signal from an overcurrent relay, and the protection apparatus operates. In the case of an external short-circuit, there should be no blanks in the rectified current, and the protection apparatus will not operate.

However, practical operation of such protection apparatus has shown that during the transients caused by internal or external short-circuits the current transformers of the apparatus may reach saturation during the first half-cycle since the onset of a fault, so that even in the case of an external short-circuit no-current blanks appear in the rectified current and this results in the non-selective disconnection of the protected plant.

There is also a form of phase-comparison protection apparatus incorporating intermediate transformers connected in the protection arms, a differential initiating element, a phase-comparison element composed of slow-to-release rectangular-pulse shapers responding to the sign of the current (or voltage), logic and integrating networks, which at first add together the individual rectangular pulses corresponding to the positive (incoming) and negative (outgoing) half-cycles of voltages proportional to the currents in the protection arms, then add together the resultant two trains of rectangular pulses, and measure the no-current blanks in the latter; when the blanks reach a predetermined value, clearance is given to disconnect the protected plant.

This form of protection suffers from the same disadvantage as the protection described earlier, although for greater selectivity of the protection in the face of considerable erros of the current transformers, use is made of slow-to-reset rectangular-pulse shapers.

An object of the present invention is to eliminate the above mentioned disadvantage.

A specific object of the invention is to provide a method for blocking of phase-comparison protection and an apparatus for its realization, which eliminate the effect of saturation in the current transformers during short-circuit transients on the selectivity of the phase-comparison protection.

This object is secured by the fact that in the method for blocking of said phase-comparison protection disclosed herein, the control signals produced by the separate summation of incoming and outgoing currents are, according to the invention, monitored during a pre-determined time interval since the instant at which a fault occurs, and if both control signals occur during said interval, a blocking signal is applied to the starting element of the protection apparatus, thereby preventing it from tripping on an external short-circuit.

To realize this method, a blocking apparatus for phase-comparison protection is proposed, comprising intermediate transformers connected in the arms of the protection circuit, a differential starting element, a phase-comparison element built around logic networks and relay elements, including those slow to reset, which according to the invention, is fitted with a slow-to-operate relay element, the input of this relay is connected via an OR gate and a slow-to-reset relay element to relay elements responding to the incoming and outgoing currents, while its output is connected to the input of an INHIBIT gate the other input of which is connected to the output of an AND gate, while the inputs of the AND gate are connected to the outputs of the relay elements responding to the incoming and outgoing currents, the output of the slow-to-reset relay elements is connected via a NOR gate to the input of a memory logic the other input of which is connected to the output of the INHIBIT gate, and the output of the memory logic is connected to the input of another INHIBIT gate connected to the differential element.

When embodied in accordance with the present invention, a method of and apparatus for blocking phase-comparison protection apparatus ensures reliable selectivity of the protection, eliminates the effect of the current transformer on its operation, and reduces the time required for the protection apparatus to operate.

The invention will be best understood from the following detailed description of a preferred embodiment when read in connection with the accompanying drawings, wherein.

Consider the method and apparatus for blocking phase-comparison protection, taking as an example the protection of a plant 1 (FIG. 1) with three connections, although their number may be any.

Figure 1:
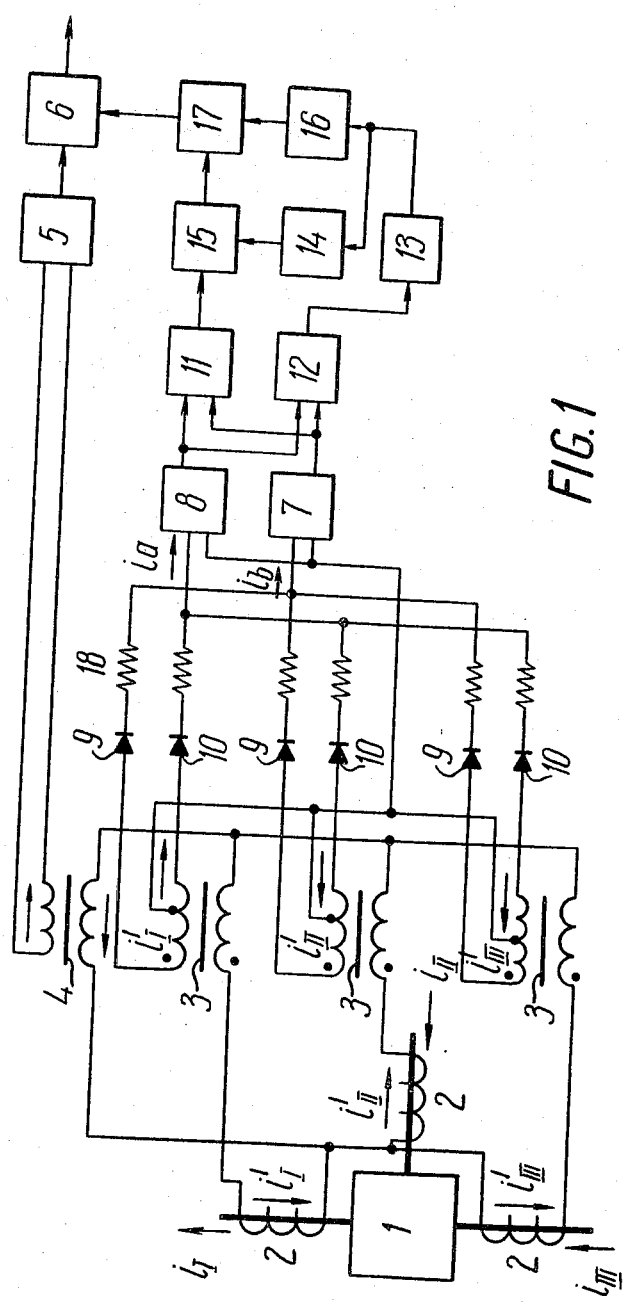
FIG. 1 is a block-diagram of a blocking apparatus for phase-comparison protection, according to a method disclosed herein.

Referring to FIG. 1, the arms of the phase-comparison protection of the plant 1 contain intermediate transformers 3 connected in series with current transformers 2.

Also connected in this circuit via an intermediate transformer 4 is a differential starting element 5 of the protection apparatus, whose output is connected to one of the inputs of an INHIBIT gate (block 6). The center-taps on the secondaries of the intermediate transformers 3 are connected to one of the inputs of relays 7 and 8 responding to the incoming and outgoing currents, with the starts of these windings being connected via rectifiers 9 to the second input of the relay 7, and the finishes of the windings being connected via rectifiers 10 to the second input of the other relay 8. The outputs of the relays 7 and 8 are connected to the AND and OR gates (blocks 11 and 12), and the output of the block 12 is connected to the input of a quick-to-operate, slow-to-reset relay 13. In turn, the output of the relay 13 is connected to the input of a slow-to-operate relay 14, and to the input of a NOR gate (an inverter 16). The output of the block 11 is connected to the input of an INHIBIT gate (block 15), the other input of which accepts the output of the relay 14. The output of the inverter 16 is connected to a memory circuit (block 17), the other input of which accepts the output of the block 15, and the output of a block 17 is connected to the inhibiting input of the INHIBIT gate (block 6).

FIG. 1 also shows resistors 18 in the circuit of the rectifiers 9 and 10, while the arrows represent the direction of the primaries currents $i_I$, $i_{II}$, and $i_{III}$, and the secondaries currents $i'_I$, $i'_{II}$, and $i'_{III}$ of the current transformers 2, and the shaped outgoing current $i_a$ and incoming current $i_b$.

As in other similar forms of apparatus, the method of and apparatus for blocking phase-comparison protection are based on a comparison of the directions of incoming and outgoing currents.

Figure 2:
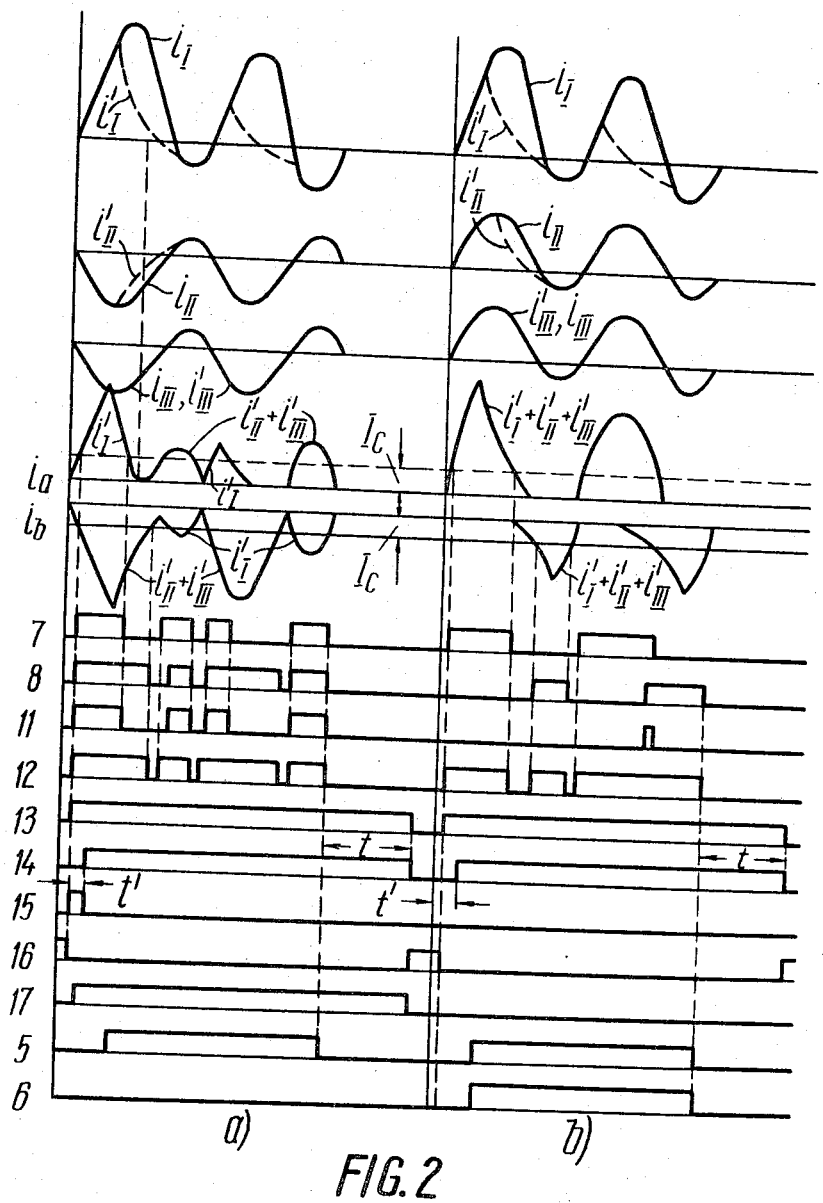
FIG. 2 (a and b) shows time waveforms of a blocking apparatus for phase-comparison protection in the case of (a) an external and (b) an internal short-circuit.

Since in the case of an external short-circuit the out-going current is equal to the sum of the incoming currents, that is, $$i_I = i_{II} + i_{III},$$

the secondary currents $i'_I$, $i'_{II}$, and $i'_{III}$ (FIG. 2a) are added together separately and two control signals, $i_a$ and $i_b$, are produced from them. This is accomplished with the aid of intermediate transformers 3 and relays 7 and 8. The relays 7 and 8 sense these control signals $i_a$ and $i_b$ when they reach a certain level $i_c$ exceeding the maximum load current.

At the very beginning of a fault, the relay 8 senses one control signal in the case of an internal short-circuit (within the protection zone of the plant), and two control signals in the case of an external short-circuit, which fact makes it possible to identify the fault (whether it is inside or outside the reach of the protection). In the case of an external short-circuit, the output signals from the relays 7 and 8 are applied to the inputs of the AND and OR gates (blocks 11 and 12). The output signal of the AND gate drives the slow-to-reset relay 13, while the output signal of the relay 13 drives the NOR gate (invertor 16) and the slow-to-operate relay 14. The output signal of the relay 14 is applied to the inhibiting input of the INHIBIT gate (block 15) the other input of which accepts the output signal of the gate 11 (block 11). Thus, owing to the time delay $t'$ with which the relay 14 operates and the time delay $t$ with which the relay 13 resets, the INHIBIT gate (block 15) can operate only at the very beginning of a short-circuit. Besides, the time delay $t$ with which the relay 13 resets provides for the transmission of continuous signals to the blocks 15 and 17.

In the case of an external short-circuit, a short-duration signal is developed across the output of the block 15, which goes to the memory logic (block 1)) which is a flip-flop, and since the invertor 16 produces no signal across its output, the flip-flop flips over and sends a blocking signal to the INHIBIT gate (block 6).

Large-out-of-balance currents due to external short-circuits may cause the differential starting element 5 to operate, but this will not lead to the disconnection of the protected plant, because the operation of the INHIBIT gate (block 6) is blocked.

After the external short-circuit has been disconnected a signal develops across the output of the inverter 16, which restores the memory logic (block 17) to the initial state, and the blocking signal is removed from the block 6.

In the case of an internal short-circuit, the OR gate operates at the very beginning of the fault and, with a time delay determined by the interval over which the outgoing and incoming current control signals $i_a$ and $i_b$ are monitored, inhibits operation of the INHIBIT gate (block 15) until the short-circuit is disconnected. Thus, as long as a short-circuit sustains, no blocking signal is applied to the input of the INHIBIT gate (block 6), and the starting element 5 operates to disconnect the protected plant.

What Is Claimed Is:

1. An apparatus for blocking phase-comparison protection, incorporating: intermediate transformers connected in the arms of the protected plant; a differential starting element connected in the arms of the protection apparatus via another intermediate transformer; a phase-comparison element incorporating OR, AND, INHIBIT, NOR and memory logic circuits, relay elements responding to incoming and outgoing currents, a slow-to-reset relay and a slow-to-operate relay; another INHIBIT gate connected to said differential starting element; the inputs of said relay elements responding to incoming and outgoing currents being connected to said intermediate transformers connected in the arms of the protected plant, the outputs of these relays being connected to the inputs of the OR and AND gates, the output of said AND gate being in turn connected to one of the inputs of the INHIBIT gate, the output of said OR gate being connected to the input of said slow-to-reset relay the output of which is connected to the input of said slow-to-operate relay and to the input of the NOR gate, the output of said slow-to-operate relay being connected to the other input of said INHIBIT gate, the output of the NOR gate being connected to one of the inputs of said memory logic, the other input of which is connected to the output of said INHIBIT gate and the output of said memory logic is connected to inhibiting input of the other INHIBIT gate connected to said differential starting element.

* * * * *